(12) United States Patent
Vuornos et al.

(10) Patent No.: US 10,412,181 B2
(45) Date of Patent: Sep. 10, 2019

(54) METHODS AND SYSTEMS FOR ADJUSTING USER EXPERIENCE ON A SOCIAL NETWORKING SERVICE USING QUOTAS

(71) Applicant: Facebook, Inc., Menlo Park, CA (US)

(72) Inventors: Lauri Vuornos, Palo Alto, CA (US); Timothy Irish Bauman, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 388 days.

(21) Appl. No.: 15/460,146

(22) Filed: Mar. 15, 2017

(65) Prior Publication Data

US 2018/0270315 A1  Sep. 20, 2018

(51) Int. Cl.
| | |
|---|---|
| *G06F 15/173* | (2006.01) |
| *H04L 29/08* | (2006.01) |
| *H04L 12/26* | (2006.01) |
| *H04L 12/24* | (2006.01) |
| *H04L 12/14* | (2006.01) |
| *H04L 29/06* | (2006.01) |
| *H04L 12/58* | (2006.01) |
| *H04L 12/70* | (2013.01) |
| *H04M 15/00* | (2006.01) |

(52) U.S. Cl.
CPC .......... *H04L 67/22* (2013.01); *H04L 12/1435* (2013.01); *H04L 12/1489* (2013.01); *H04L 41/5067* (2013.01); *H04L 41/5093* (2013.01); *H04L 43/16* (2013.01); *H04L 47/00* (2013.01); *H04L 51/32* (2013.01); *H04L 65/602* (2013.01); *H04L 65/80* (2013.01); *H04M 15/80* (2013.01); *H04M 15/8016* (2013.01); *H04M 15/8022* (2013.01); *H04M 15/81* (2013.01); *H04M 15/852* (2013.01); *H04M 15/88* (2013.01)

(58) Field of Classification Search
CPC ............ H04L 12/1435; H04L 12/1489; H04L 41/5067; H04L 41/5093; H04L 43/16; H04L 47/00; H04L 51/32; H04L 65/602; H04L 65/80; H04L 67/22
USPC .................. 709/204, 223, 224, 227, 228
See application file for complete search history.

(56) References Cited

U.S. PATENT DOCUMENTS

| | | | |
|---|---|---|---|
| 2014/0064071 A1* | 3/2014 | Paladugu .......... | H04W 28/0268 370/230 |
| 2014/0064124 A1* | 3/2014 | Paladugu .............. | H04W 76/19 370/252 |
| 2014/0066084 A1* | 3/2014 | Paladugu .............. | H04W 28/24 455/452.2 |

(Continued)

*Primary Examiner* — Liang Che A Wang
(74) *Attorney, Agent, or Firm* — Morgan, Lewis & Bockius LLP

(57) ABSTRACT

A method of adjusting user experience on a social networking service includes setting a data-usage threshold for a plurality of features in the social networking service, providing the plurality of features to a user of the social networking service at an initial quality of service, and monitoring data usage by the user during a period of time in which the plurality of features is provided to the user. The method further includes, in response to a determination that the data usage by the user during the period of time satisfies the data-usage threshold: (1) reducing the quality of service for the user for one or more features of the plurality of features, and (2) providing the one or more features to the user at the reduced quality of service.

15 Claims, 12 Drawing Sheets

(56) References Cited

U.S. PATENT DOCUMENTS

2014/0098671 A1* 4/2014 Raleigh .................. H04L 69/14
                                                                        370/235
2017/0078922 A1* 3/2017 Raleigh ................ H04W 28/10
2017/0201850 A1* 7/2017 Raleigh .................. H04W 4/50
2018/0270315 A1* 9/2018 Vuornos ................ H04L 67/22

* cited by examiner

METHODS AND SYSTEMS FOR ADJUSTING USER EXPERIENCE ON A SOCIAL NETWORKING SERVICE USING QUOTAS

TECHNICAL FIELD

This relates generally to adjusting user experience on social networking services, including but not limited to adjusting user experience on the social networking services using quotas (e.g., data-usage thresholds).

BACKGROUND

Social networking services provide a convenient means for users to transfer information. Internet service providers, such as the social networking services, may desire to adjust user experience for their users based on data usage of the users. Adjusting the user experience at different levels of granularity, however, can present challenges.

SUMMARY

Accordingly, there is a need for methods and systems for adjusting user experience at different levels of granularity using quotas. Setting a data-usage threshold for a plurality of features in a social networking service, providing the plurality of features to a user of the social networking service at an initial quality of service, and reducing the quality of service for the user for one or more features of the plurality of features in response to a determination that the data usage by the user during the period of time satisfies the data-usage threshold allows the social networking service to adjust user experience at different levels of granularity. Such methods and systems provide the social networking service with processes to set data-usage thresholds based for example, at least in part, on user selections and/or data-usage patterns for respective users of the social networking service.

In accordance with some embodiments, a method is performed at a server system having one or more processors and memory storing instructions for execution by the one or more processors. The method includes setting a data-usage threshold for a plurality of features in a social networking service, providing the plurality of features to a user of the social networking service at an initial quality of service, and monitoring data usage by the user during a period of time in which the plurality of features is provided to the user. The method further includes, in response to a determination that the data usage by the user during the period of time satisfies the data-usage threshold: (1) reducing the quality of service for the user for one or more features of the plurality of features, and (2) providing the one or more features to the user at the reduced quality of service.

In accordance with some embodiments, a server system includes one or more processors/cores and memory storing one or more programs configured to be executed by the one or more processors/cores. The one or more programs include instructions for performing the operations of the method described above. In accordance with some embodiments, a non-transitory computer-readable storage medium has stored therein instructions that, when executed by one or more processors/cores of a server system, cause the server system to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Figure 1:
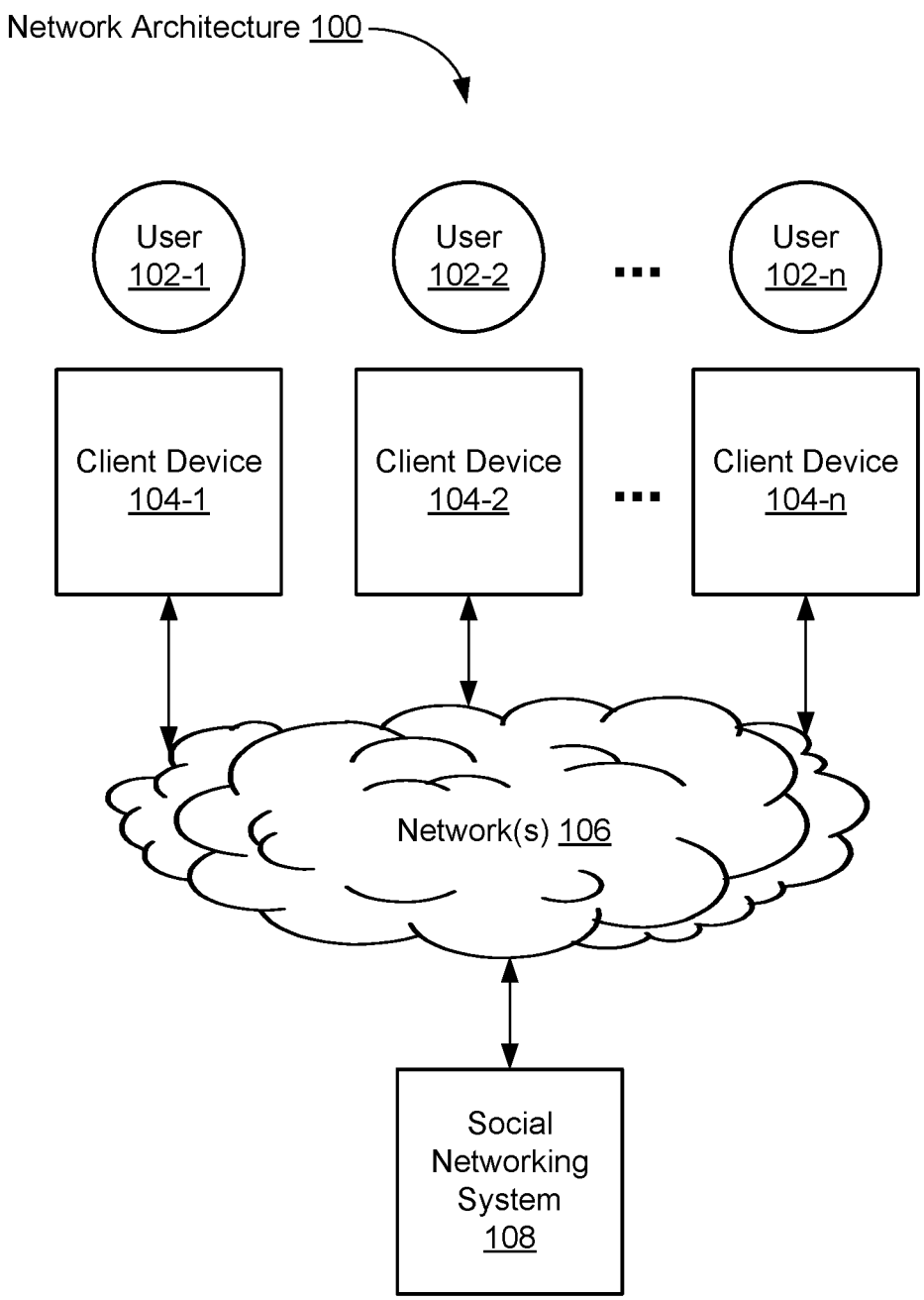
FIG. 1 is a block diagram illustrating an exemplary network architecture of a social network in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first plurality of features could be termed a second plurality of features, and, similarly, a second plurality of features could be termed a first plurality of features, without departing from the scope of the various described embodiments. The first plurality of features and the second plurality of features are both pluralities of features service, but they are not the same pluralities of features, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture of a social network in accordance with some embodiments. The network architecture 100 includes a number of client devices (also called "client systems," "client computers," "devices," or "clients") 104-1, 104-2, . . . 104-n communicably connected to a social networking system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system and other computing devices (e.g., via the electronic social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social networking system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in the social networking service provided by the social networking system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos (i.e., images), videos, audio files, links, documents), and/or other electronic content. In some embodiments, users provide information to a page, group, message board, feed, and/or user profile of a social networking service provided by the social networking system 108. Users of the social networking service can also annotate information posted by other users of the social networking service (e.g., endorsing or "liking" a posting of another user, commenting on a posting by another user, or sharing a posting of another user).

In some embodiments, information can be posted on a user's behalf by systems and/or services external to the social network or the social networking system 108. For example, the user may post a review of a movie to a movie review website, and with proper permissions that website may cross-post the review to the social network on the user's behalf. In another example, a software application executing on a mobile client device, with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," "In San Francisco, Calif.," etc.), and/or update the social network with information derived from and/or based on the user's location. Users interacting with the client devices 104-1, 104-2, . . . 104-n can also use the social network provided by the social networking system 108 to define groups of users.

Users interacting with the client devices 104-1, 104-2, . . . 104-n can also use one or more features in the social network provided by the social networking system 108. The one or more features may be built-in features and/or other software applications provided with the social network. For example, the one or more features may include a message feature (or a messaging application) which users may use to communicate and collaborate with each other. The one or more features may include other features such as an image feature, a video feature, a notification feature, and many others (discussed below).

In some embodiments, the network architecture 100 may also include third-party servers (not shown). In some embodiments, third-party servers are associated with third-party service providers that provide services and/or features to users of a network.

Figure 2A:
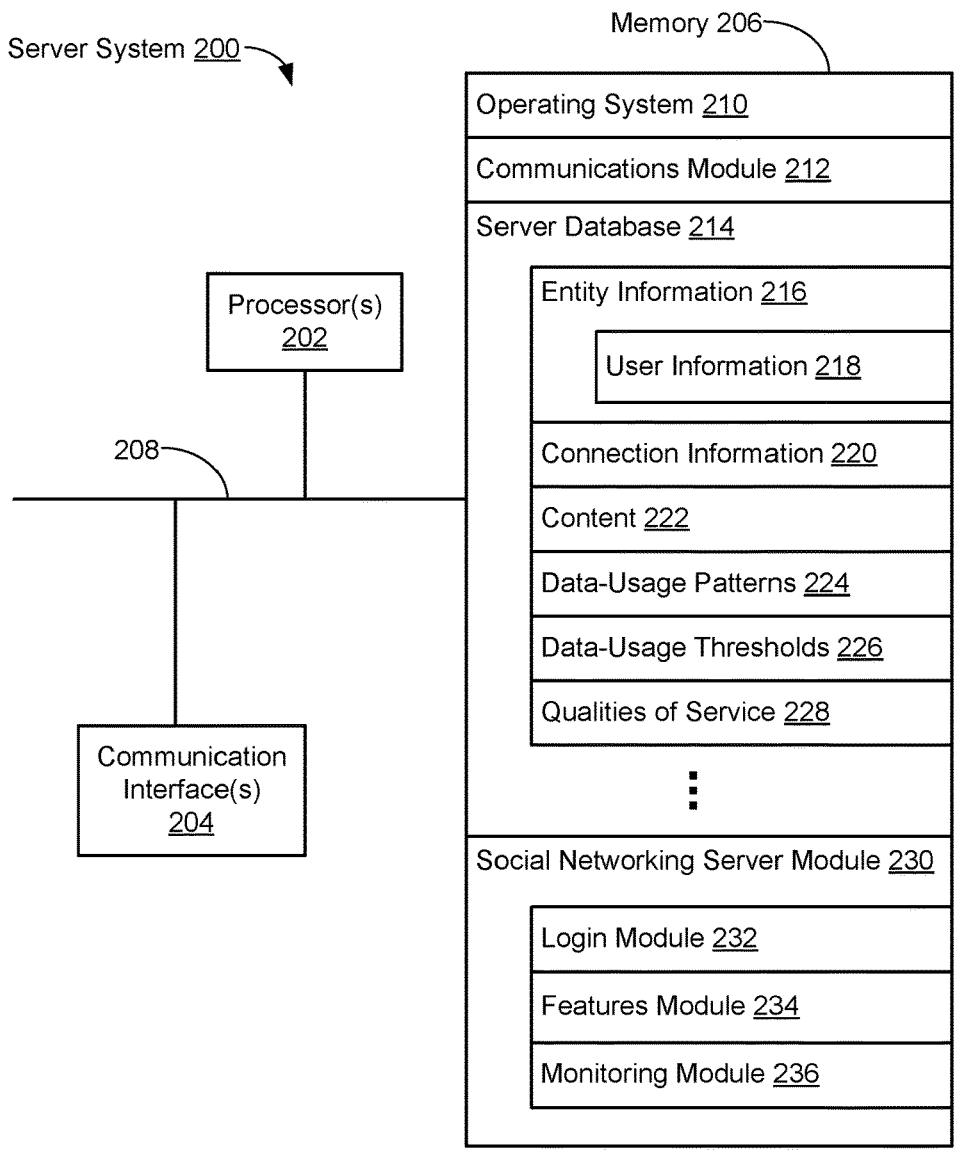
FIG. 2A is a block diagram illustrating an exemplary server system, in accordance with some embodiments.

FIG. 2A is a block diagram illustrating an exemplary server system 200 in accordance with some embodiments. In some embodiments, the server system 200 is an example of the social networking system 108 (FIG. 1). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 2B:
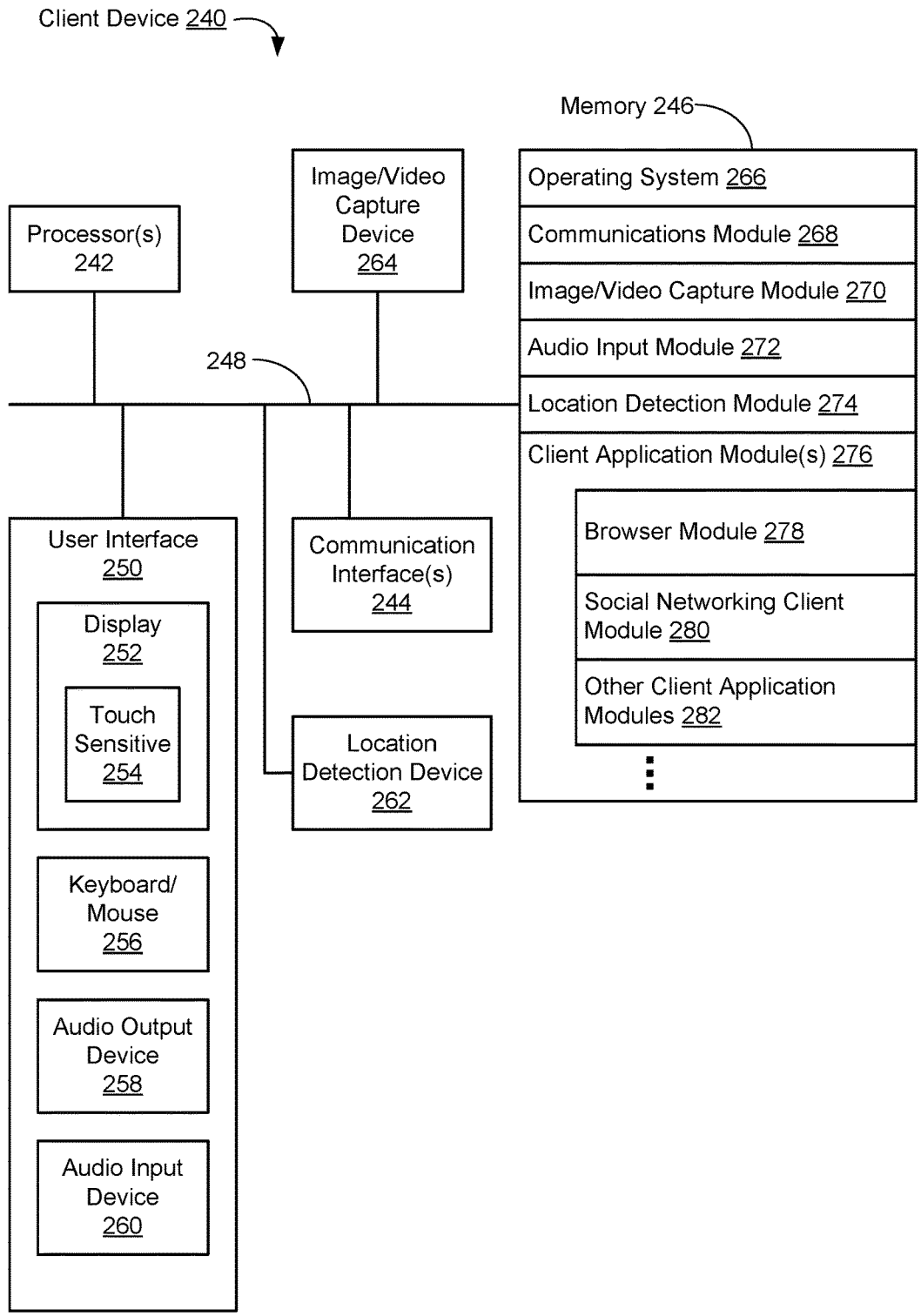
FIG. 2B is a block diagram illustrating an exemplary client device, in accordance with some embodiments.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- an operating system 210 that includes procedures for handling various basic system services and for performing hardware-dependent tasks;
- a network communication module 212 that is used for connecting server system 200 (e.g., social networking system 108, FIG. 1) to other computers (e.g., client devices 104-1, 104-2, . . . 104-n, and/or third party servers) via the one or more communication network interfaces 204 (wired or wireless) and one or more communication networks 106 (FIG. 1), such as the Internet, cellular telephone networks, mobile data networks, other wide area networks, local area networks, metropolitan area networks, and so on;
- a server database 214 for storing data associated with the social networking service, such as:
  - entity information 216, such as user information 218, which includes content items (e.g., images, videos, etc.) and other user information (e.g., data-usage patterns, user selections, etc.);
  - connection information 220;
  - user content 222; and
  - data-usage patterns 224 (e.g., determined data-usage patterns of users of a social networking service);
  - data-usage thresholds 226; and
  - qualities of service 228;
- a social networking server module 230 for providing social networking services and related features (e.g., in conjunction with social networking client module 280 on the client device 240, FIG. 2B) (e.g., an image feature, a video feature, etc.), which includes:
  - a login module 232 for logging a user 102 at a client device 104 into the social networking system 108;
  - a features module 234 for providing features (e.g., a first plurality of features and/or a second plurality of features) to users at various qualities of service based on data usage by respective users (e.g., users 102, FIG. 1) of the social networking service; and
  - a monitoring module 236 for monitoring data usage by respective users of the social networking service.

The server database 214 stores data associated with the server system 200 in one or more types of databases, such as text, graph, dimensional, flat, hierarchical, network, object-oriented, relational, and/or XML databases.

In some embodiments, the server database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with say, profile pictures of the user (or other photos of the user). In some embodiments, the user information may include preferred features, data-usage patterns for the user, and current data usage for a given period of time.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social networking system 108 (e.g., in content 222) or on an external server, such as a third-party server (not shown).

In some embodiments, connection information 220 includes information about the relationships between entities in server database 214. In some embodiments, connection information 220 includes information about edges that connect pairs of nodes in a graph database. In some embodiments, an edge connecting a pair of nodes represents a relationship between the pair of nodes (e.g., also referred to herein as a contact).

In some embodiments, an edge includes or represents one or more data objects or attributes that correspond to the relationship between a pair of nodes. For example, when a first user indicates that a second user is a "friend" of the first user, the social networking system 108 may transmit a "friend request" to the second user. If the second user confirms the "friend request," the social networking system 108 may create and store an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon (e.g., an affordance). After the user clicks one of these icons, the social networking system 108 may create a "like" edge, "check in" edge, a "favorites" edge, etc. in response to the corresponding user action. As another example, the user may listen to a particular song using a particular application (e.g., an online music application). In this case, the social networking system 108 may create a "listened" edge and a "used" edge between the user node that corresponds to the user and the entity nodes that correspond to the song and the application, respectively, to indicate that the user listened to the song and used the application. In addition, the social networking system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio (e.g., an audio file such as mp3), video (e.g., mpeg), other multimedia, and/or combinations thereof. In some embodiments, content 222 includes executable code (e.g., script for API calls), podcasts, links, and the like.

In some embodiments, the data-usage patterns 224 include data usage by respective users of the social networking service during a statistically significant period of time (e.g., during a month, a week, etc.). The server system may determine one or more data-usage patterns for a first user 102-1 during the period of time (e.g., data-usage patterns 322 and 324, FIG. 3C), one or more data-usage patterns for a second user 102-2 during the period of time, and so on. In some embodiments, the server system 200 may set one or more data-usage thresholds 226 based, at least in part, on the data-usage patterns 224.

In some embodiments, the data-usage thresholds 226 are threshold amounts of mobile data available for consumption by a user during the period of time (i.e., data quotas). A first data-usage threshold (e.g., data-usage threshold 304, FIG. 3A), when triggered, may result in the user's experience being adjusted (e.g., reduced/degraded) by the server system 200. A second data-usage (e.g., data-usage threshold 306, FIG. 3A), when triggered, may result in the user's experience being further adjusted by the server system 200. Examples of the data-usage thresholds 226 are discussed in further detail below with reference to FIGS. 3A-3B.

In some embodiments, the qualities of service 228 refer to user experience on a website or an application provided by the server system 200 (e.g., users may access the social networking service, and its features, through the website and/or the application via a client device 104). A first quality of service (also referred to herein as an initial quality of service) may be a quality of service that is unadjusted. A second quality of service (also referred to herein as a reduced quality of service), on the other hand, may be a quality of service that has been adjusted (e.g., reduced/ degraded) by the server system 200. Transition from the first quality of service to the second quality of service, at least in some embodiments, may occur when data usage for a user of the social networking service meets and/or exceeds a data-usage threshold (e.g., data-usage 302 meeting and/or exceeding data-usage threshold 304, FIG. 3A) during the period of time.

FIG. 2B is a block diagram illustrating an exemplary client device 240, in accordance with some embodiments. The client device 240 is an example of the one or more client devices 104-1, 104-2, . . . 104-n (FIG. 1). The client device 240 typically includes one or more processing units (processors or cores) 242, one or more network or other communications interfaces 244, memory 246, and one or more communication buses 248 for interconnecting these components. The communication buses 248 optionally include circuitry (sometimes called a chipset) that interconnects and controls communications between system components. The client device 240 includes a user interface 250. The user interface 250 typically includes a display device 252. In some embodiments, the client device 240 includes inputs such as a keyboard, mouse, and/or other input buttons 256. Alternatively or in addition, in some embodiments, the display device 252 includes a touch-sensitive surface 254, in which case the display device 252 is a touch-sensitive display. In some embodiments, the touch-sensitive surface 254 is configured to detect various swipe gestures (e.g., continuous gestures in vertical and/or horizontal directions) and/or other gestures (e.g., single/double tap). In client devices that have a touch-sensitive display 252, a physical keyboard is optional (e.g., a soft keyboard may be displayed when keyboard entry is needed). The user interface 250 also includes an audio output device 258, such as speakers or an audio output connection connected to speakers, earphones, or headphones. Furthermore, some client devices 240 use a microphone and voice recognition to supplement or replace the keyboard. Optionally, the client device 240 includes an audio input device 260 (e.g., a microphone) to capture audio (e.g., speech from a user). Optionally, the client device 240 includes a location detection device 262, such as a GNSS (e.g., GPS, GLONASS, etc.) or other geo-location receiver, for determining the location of the client device 240. The client device 240 also optionally includes an image/video capture device 264, such as a camera and/or a webcam.

In some embodiments, the client device 240 includes one or more optional sensors (e.g., gyroscope, accelerometer) for detecting motion and/or a change in orientation of the client device. In some embodiments, the detected motion and/or orientation of the client device 240 (e.g., the motion/change in orientation corresponding to a user input produced by a user of the client device) is used to manipulate an interface (or content within the interface) displayed on the client device 240. In some embodiments, the one or more optional sensors may include an optical projection sensor for projecting an interface displayed on the client device 240 in 3D (e.g., project 3D hologram). Moreover, a user may manipulate the interface displayed on the client device 240 by interacting with the projected holographic 3D display.

Memory 246 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 246 may optionally include one or more storage devices remotely located from the processor(s) 242. Memory 246, or alternately the non-volatile memory device(s) within memory 246, includes a non-transitory computer-readable storage medium. In some embodiments, memory 246 or the computer-readable storage medium of memory 246 stores the following programs, modules, and data structures, or a subset or superset thereof:

an operating system 266 that includes procedures for handling various basic system services and for performing hardware-dependent tasks;

a network communication module 268 that is used for connecting the client device 240 to other computers via the one or more communication network interfaces 244 (wired or wireless) and one or more communication networks 106 (FIG. 1), such as the Internet, cellular telephone networks, mobile data networks, other wide area networks, local area networks, metropolitan area networks, and so on;

an image/video capture module 270 (e.g., a camera module) for processing a respective image or video captured by the image/video capture device 264, where the respective image or video may be sent or streamed (e.g., by a client application module 276) to the social networking system 108;

an audio input module 272 (e.g., a microphone module) for processing audio captured by the audio input device 260, where the respective audio may be sent or streamed (e.g., by a client application module 276) to the social networking system 108;

a location detection module 274 (e.g., a GPS, Wi-Fi, or hybrid positioning module) for determining the location of the client device 240 (e.g., using the location detection device 262) and providing this location information for use in various applications (e.g., social network client module 280); and one or more client application modules 276, including the following modules (or sets of instructions), or a subset or superset thereof:

a web browser module 278 (e.g., Internet Explorer or Edge by Microsoft, Firefox by Mozilla, Safari by Apple, or Chrome by Google) for accessing, viewing, and interacting with web sites;

a social networking client module 280 for providing an interface to a social networking service (e.g., a social networking service provided by social networking system 108) and related features, and for loading (e.g., within the interface for the social networking client module 280) pages associated with third-party service providers (e.g., to conduct transactions with the third-party service providers); and/or optional client application modules 282, such as applications for word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D gaming, virtual reality, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 246 store a subset of the modules and data structures identified above. Furthermore, memory 206 and/or 246 optionally store additional modules and data structures not described above.

Figure 3A:
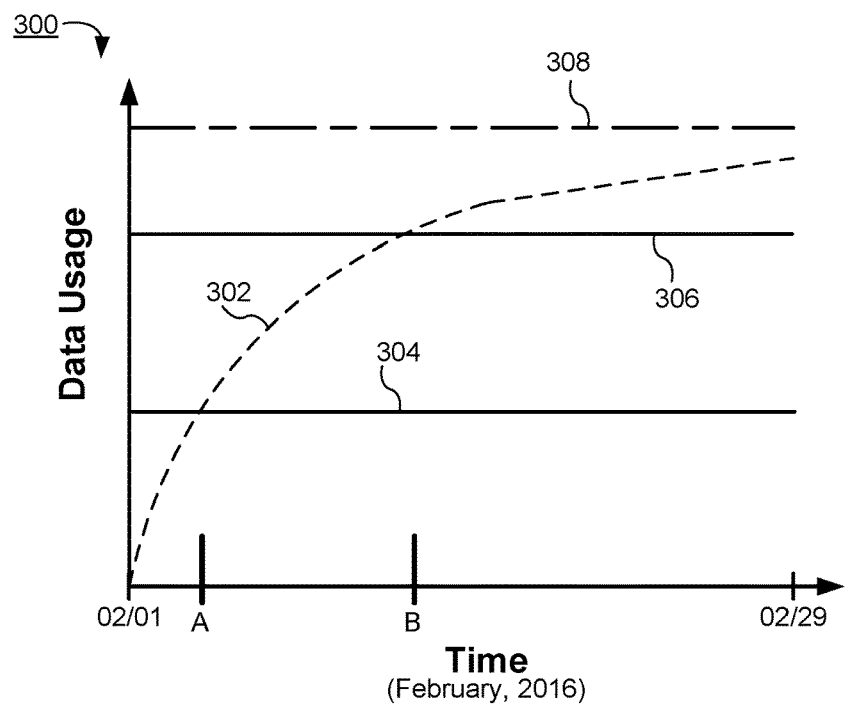
FIG. 3A is a prophetic diagram of a data-usage pattern by a user of a social networking service during a period of time, in accordance with some embodiments.

FIG. 3A is a diagram 300 showing a prophetic example of data usage by a user of a social networking service during a period of time, in accordance with some embodiments. The diagram 300 includes measured data usage 302 over the period of time (e.g., Feb. 1, 2016 to Feb. 29, 2016) for a plurality of features provided by the social networking service. The diagram 300 may include one or more data-usage thresholds. In some embodiments, the social networking system may set the data-usage thresholds, which may be data quotas and may be based on an average data usage on the social networking service by its users (e.g., on a website and/or application for the social networking service). In some embodiments, one or more of the data-usage thresholds may be set by a third party (e.g., a government agency). In some embodiments, the social networking system may set the one or more data-usage thresholds using other criteria or information.

In some embodiments, the social networking system may set a first data-usage threshold 304. The first data-usage threshold 304 (e.g., a first data quota) may be triggered when data usage for a respective user of the social networking service satisfies (e.g., exceeds, or equals or exceeds) it. For example, at point in time A, the data usage 302 for the respective user satisfies (e.g., meets and/or exceeds) the first data-usage threshold 304. In response to the data usage 302 satisfying the first data-usage threshold 304, the social networking system (e.g., server system 200, FIG. 2A) may reduce a quality of service of one or more features provided to the respective user. For example, the social networking system may reduce a resolution of an image provided in an image feature. In some embodiments, the first data-usage threshold 304 is set for a first plurality of features (or a second plurality of features). In some embodiments, the first data-usage threshold 304 is set for overall data usage by the respective user (i.e., is not specific to certain features). Reducing the quality of service is discussed in further detail below.

In some embodiments, the social networking system may set a second data-usage threshold 306. The second data-usage threshold 306 (e.g., a second data quota) may be triggered when data usage for the respective user satisfies (e.g., exceeds, or equals or exceeds) it. For example, at point in time B, the data usage 302 for the respective user satisfies (e.g., meets and/or exceeds) the second data-usage threshold 306. In response to the data usage 302 satisfying the second data-usage threshold 306, the social networking system may further reduce a quality of service of one or more features provided to the respective user. For example, the social networking system may further reduce the resolution of the image provided in the image feature. In some embodiments, in response to the data usage 302 satisfying the second data-usage threshold 306, the social networking system may cease providing certain features to the user (e.g., cease providing the image feature). In some embodiments, the one or more features with the further reduced quality of service are the same one or more features with the reduced quality of service. In some embodiments, the one or more features with the further reduced quality of service may be a subset of the one or more features with the reduced quality of service.

In some embodiments, the social networking system may set a third data-usage threshold 308. The third data-usage threshold 308 (e.g., a third data quota) may be triggered when data usage for the respective user of the social networking service satisfies (e.g., exceeds, or equals or exceeds) it. In some embodiments, in response to the data usage 302 satisfying the third data-usage threshold 308, the social networking system may cease providing certain or all features to the user. Alternatively, in some embodiments, the third data-usage threshold 308 may be set after the user pays for the third data-usage threshold 308 (or receives a quota donation). As such, after payment, triggering of the third data-usage threshold 308 may result in actions similar to actions resulting from triggering of the first and/or second data-usage thresholds (e.g., reducing a quality of service to one or more features from an initial quality of service).

Figure 3B:
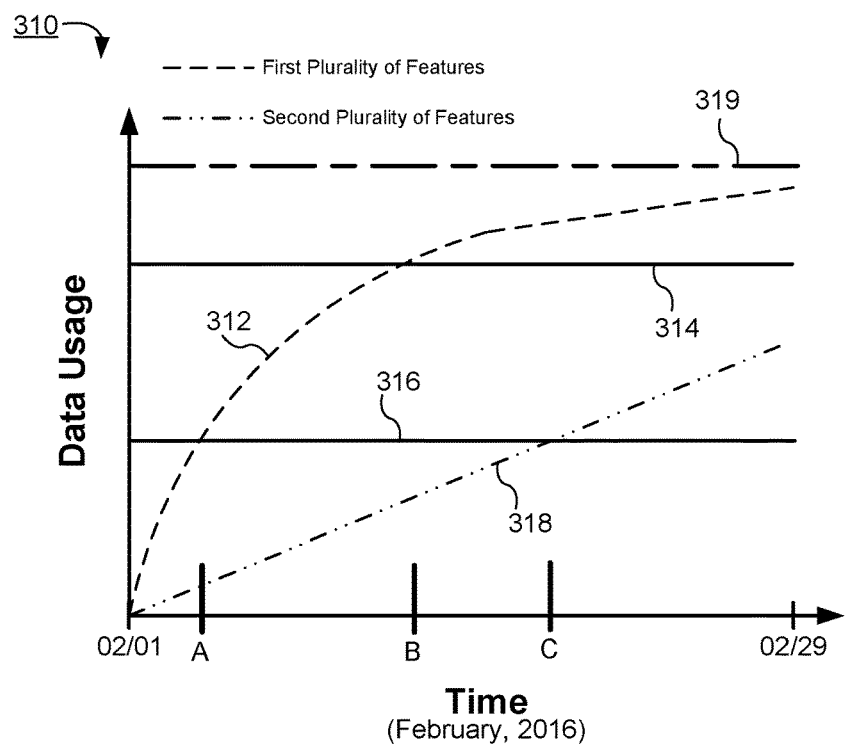
FIG. 3B is a prophetic diagram of data usage by a user of a social networking service during a period of time, in accordance with some embodiments.

FIG. 3B is a diagram 310 of a prophetic example of data usage by a user of a social networking service during a period of time, in accordance with some embodiments. The diagram 310 includes measured data usage for a first plurality of features 312 provided by the social networking service over the period of time and measured data usage for a second plurality of features 318 provided by the social networking service over the period of time. The diagram 310 may include one or more data-usage thresholds similar to the thresholds in the diagram 300. However, in some embodiments, the one or more data-usage thresholds in the diagram 310 may be set based, at least in part, on data usage for particular pluralities of features. For example, a first data-usage threshold 314 may be triggered when data usage for the first plurality of features 312 satisfies it (e.g., data quota exhausted). In another example, a second data-usage threshold 316 may be triggered when data usage for the second plurality of features 318 satisfies it. In some embodiments, the second data-usage threshold 316 is different from the first data-usage threshold 314. In some embodiments, the first and second data-usage thresholds are the same.

The diagrams 300 and 310 include data usage associated with users interacting with the social networking service provided by the social networking system. For example, the data usage refers to mobile data usage. Each time a user logs onto the social networking service, the user consumes data (e.g., sending a message, loading a video, loading a webpage, loading an image, etc.).

Figure 3C:
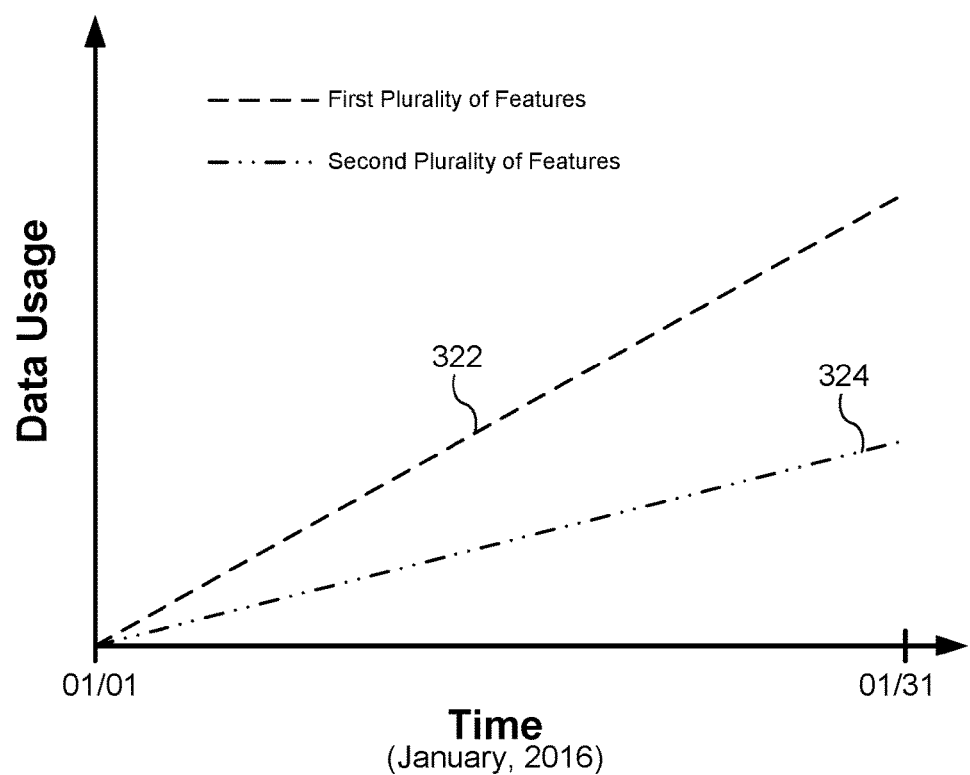
FIG. 3C is a prophetic diagram of data-usage patterns by a user of a social networking service during a period of time, in accordance with some embodiments.

FIG. 3C is a diagram 320 of a prophetic example of data-usage patterns for a user (e.g., user 102-1) of a social networking service during a statistically significant period of time. The diagram 320 includes a data-usage pattern 322 for a first plurality of features provided by the social networking service. For example, the first plurality of features may include an image feature and a video feature. The diagram 300 includes a data-usage pattern 324 for a second plurality of features provided by the social networking service. In some embodiments, the second plurality of features may include features not included in the first plurality of features (e.g., a notification feature and a messaging feature). Alternatively, in some embodiments, the second plurality of features may overlap with one or more features from the first plurality of features. Although the diagram 320 illustrates two distinct data-usage patterns, in some embodiments, the data-usage patterns are combined to form an overall data-usage pattern. Moreover, the diagram 320 may include a third data-usage pattern for a third plurality of features, a fourth data-usage pattern for combinations of pluralities of features, and so on.

Figure 4B:
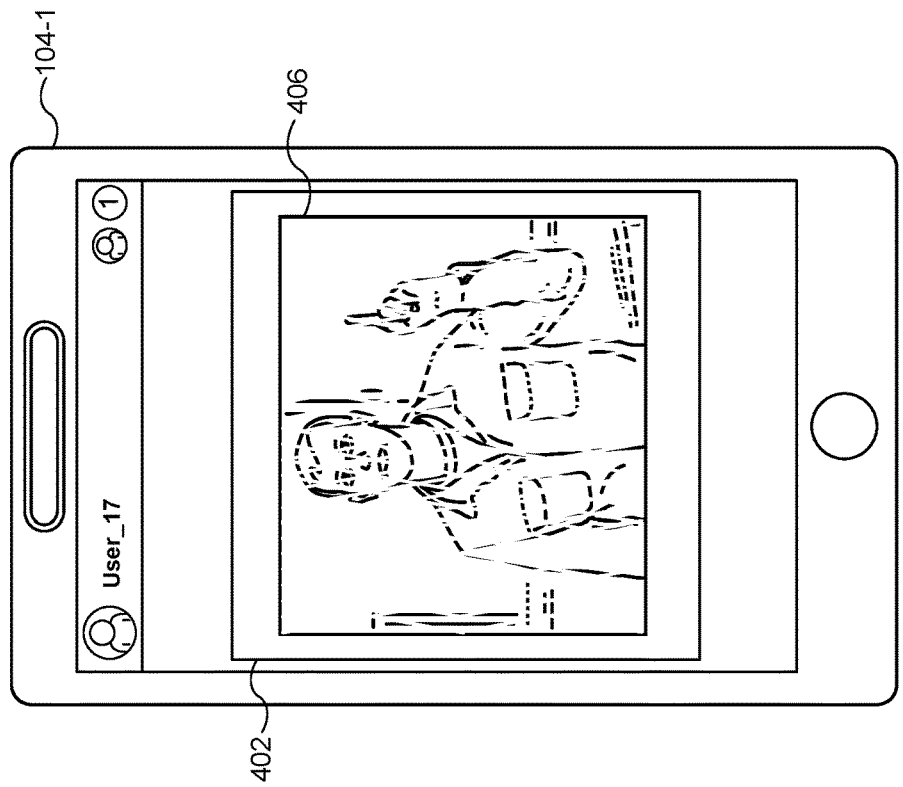
FIGS. 4A-4B illustrate exemplary graphical user interfaces (GUIs) of an image provided in an image feature of a social networking service on a client device, in accordance with some embodiments.
Figure 4A:
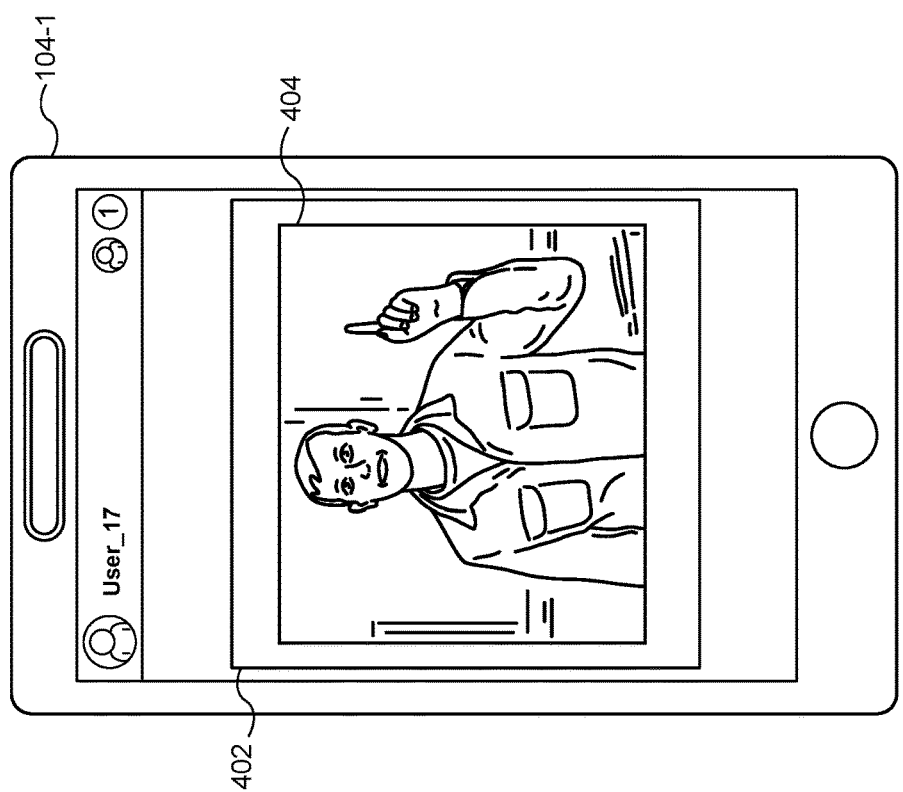

FIGS. 4A-4B illustrate exemplary GUIs (e.g., on client devices 104-1, 104-2, . . . 104-n, FIG. 1; client device 240, FIG. 2B) for providing a feature to a user (e.g., user 102-1 or 102-2, FIG. 1) of a social networking service based on data usage by the user. FIG. 4A illustrates an image 404 displayed at a first quality of service (also referring to herein as an initial quality of service) on the client device 104-1 in an image feature 402 provided by the social networking system. FIG. 4B illustrates an image 406 displayed at a second quality of service (also referring to herein as a reduced quality of service) on a client device 104-1 in the image feature 402. In some embodiments, the GUIs shown may be provided by an application for the social networking service executing on the client device 104-1. Alternatively, in some embodiments, the GUIs shown may be provided on a webpage for the social networking service loaded by the client device 104-1. The GUIs in these figures are used to illustrate the processes described below, including the method 500 (FIGS. 5A-5F). While FIGS. 4A-4B illustrate examples of GUIs, in other embodiments, one or more GUIs display user-interface elements in arrangements distinct from the embodiments of FIGS. 4A-4B.

FIGS. 5A-5F are flow diagrams illustrating a method 500 of adjusting a user experience on a social networking service, in accordance with some embodiments. The steps of the method 500 may be performed by a social networking system (e.g., social networking system 108, FIG. 1; server system 200, FIG. 2A). FIGS. 5A-5F correspond to instructions stored in a computer memory or computer-readable storage medium (e.g., memory 206 of the server system 200, FIG. 2A). For example, the operations of method 500 are performed, at least in part, by a social networking server module (e.g., social networking server module 230, FIG. 2A). To assist with describing the method 500, the method 500 will be described with reference to the exemplary GUIs illustrated in FIGS. 4A-4B, as well as the diagrams in FIGS. 3A-3C.

In performing the method 500, the social networking system may set (502) a data-usage threshold (also referred to herein a first data-usage threshold) for a plurality of features (also referred to herein as a first plurality of features) in the social networking service. The data-usage threshold (e.g., first data-usage threshold 304, FIG. 3A or first data-usage threshold 314, FIG. 3B) may be a threshold amount of mobile data available for consumption by a user (e.g., user 102-1, FIG. 1) of the social networking service during a period of time (504). For example, the social networking system may allot the user an amount of mobile data for the period of time (e.g., allot a data quota); the allotted amount of mobile data is the data-usage threshold. In some embodiments, the user may initially consume mobile data at an initial quality of service (discussed below). In some embodiments, the plurality of features may include an image feature, a video feature, an audio feature (e.g., to play audio files), a messaging feature, a notification feature, a news feature, a friending feature, and/or the like. In some embodiments, mobile data consumption may refer to transferring and/or downloading data over a network (e.g., the networks 106, FIG. 1).

In some embodiments, the social networking system may set a second data-usage threshold (e.g., second data-usage threshold 306, FIG. 3A or second data-usage threshold 316, FIG. 3B). For example, the social networking system may set (506) a second data-usage threshold for the plurality of features in the social networking service. For example, referring to FIG. 3A, the social networking system may set a first data-usage threshold 304 (e.g., the data-usage threshold may be the first data-usage threshold 304) and a second data-usage threshold 306. In some embodiments, the second data-usage threshold may be greater than the first data-usage threshold (508).

In some embodiments, the social networking system may set (552, FIG. 5C) a second data-usage threshold for a second plurality of features in the social networking service. For example, referring to FIG. 3B, the social networking system may set a first data-usage threshold 314 which is monitored with respect to usage (e.g., data usage 312) of a first plurality of features. Moreover, the social networking system may set a second data-usage threshold 316 which is monitored with respect to usage (e.g., data usage 318) of a second plurality of features. In some embodiments, the second data-usage threshold is different from the first data-usage threshold (e.g., as shown in FIG. 3B). However, in some embodiments, the first and second data-usage thresholds may be the same. In some embodiments, the social networking system may set a third data-usage threshold for a third plurality of features, a fourth data-usage threshold for a fourth plurality of features, and so on. In some embodiments, the user may define compositions of the plurality of features. In some embodiments, the social networking system may define compositions of the plurality of features.

The social networking system may provide (510, FIG. 5A) the plurality of features to the user of the social networking service at an initial quality of service. In addition, in those embodiments involving first and second pluralities of features, the social networking system may also provide (554, FIG. 5C) the second plurality of features to the user at the initial quality of service during the period of time. In some embodiments, the social networking system may provide the second plurality of features to the user at the initial quality of service until the data usage (e.g., data usage associated with the second plurality of features, data usage associated with the first plurality of features, or a combination of the two) by the user satisfies the second data-usage threshold (discussed below).

The social networking system may monitor (512, FIG. 5A) data usage by the user during the period of time in which the plurality of features is provided to the user. For example, referring to FIG. 3A, the social networking system monitors (e.g., tracks) data usage by the user (e.g., user 102-1) during the month of February, 2016. In this way, the social networking system may compare data usage 302 by the user throughout the month against one or more data-usage thresholds (e.g., the first data usage threshold 304 and/or the second data usage threshold 306). In some embodiments, the period of time is a month. Accordingly, the social networking system may reset data quotas for the user beginning in March, 2016.

In another example, referring to FIG. 3B, the social networking system monitors (e.g., tracks) data usage by the user with respect to specific pluralities of features. In this way, the social networking system may compare data usage for the first plurality of features 312 against the first data-usage threshold 314 and may compare data usage for the second plurality of features 318 against the second data-usage threshold 316.

In some embodiments, in response to a determination that the data usage by the user during the period of time does not satisfy the data-usage threshold (514—No), the social networking system may continue (516) providing the plurality of features at the initial quality of service. For example, referring to FIG. 3A, the data usage 302 by the user prior to point in time A does not meet and/or exceed the first data-usage threshold 304. As such, prior to the point in time A, the social networking system may continue providing the plurality of features at the initial quality of service. In another example, referring to FIG. 3B, data usage for the first plurality of features 312 by the user prior to point in time B does not meet and/or exceed the first data-usage threshold 314. As such, prior to the point in time B, the social networking system may continue providing the first plurality of features at the initial quality of service. The same analysis may apply to the second plurality of features in FIG. 3B, but with respect to point in time C.

To illustrate the initial quality of service, now referring to FIG. 4A, the user may request (e.g., prior to point in time A, FIG. 3A) to view an image in an image feature provided by the social networking service. In response, the social networking system may render (e.g., load) the image in the image feature, such that a client device 104 displays the image. When rendering the image in the image feature, the social networking system provides the image at a specified (e.g., full) resolution.

In some embodiments, in response to a determination that the data usage by the user during the period of time satisfies the data-usage threshold (514—Yes), the social networking system may reduce (518, FIG. 5B) the quality of service for the user for one or more features of the plurality of features. For example, referring to FIG. 3A, at point in time A, data usage 302 by the user satisfies (e.g., meets and/or exceeds) the first data-usage threshold 304. As such, after the point in time A, the social networking system may reduce the initial quality of service for one or more (e.g., all) features of the plurality of features.

In addition, in those embodiments involving first and second pluralities of features, in response to a determination that the data usage (e.g., data usage for the first plurality of features 312, FIG. 3B) by the user during the period of time satisfies the first data-usage threshold, the social networking system may reduce the quality of service for the user for one or more features of the first plurality of features. For example, referring to FIG. 3B, at point in time B, data usage for the first plurality of features 312 by the user satisfies the first data-usage threshold 314. As such, after the point in time B, the social networking system may reduce the initial quality of service for one or more (e.g., all) features of the first plurality of features.

Alternatively, in some embodiments, in response to a determination that the data usage (e.g., data usage for the second plurality of features 318, FIG. 3B) by the user during the period of time satisfies the second data-usage threshold, the social networking system may reduce (548) the quality of service for the user for one or more features of the second plurality of features. For example, referring to FIG. 3B, data usage for the second plurality of features 318 by the user after point in time C satisfies the second data-usage threshold 316. As such, after the point in time C, the social networking system may reduce the initial quality of service for one or more features of the second plurality of features.

The reduced quality of service may be a quality of service that is inhibited in some respect (e.g., the social networking system may degrade the user's experience in the one or more features). For example, the one or more features may include an image feature and the social networking system may reduce (520) a resolution of an image in the image feature. For example, referring to FIG. 4B, the social networking system may provide image 406 to client device 104-1 with a reduced resolution. In some embodiments, the social networking system may modify and/or otherwise restrict the image in the image feature. For example, the social networking system may modify one or more image characteristics such as contrast, exposure, and/or size. In another example, the social networking system may restrict interactions with the image (e.g., the user may not be able to like, comment, and/or share the restricted image). In some embodiments, the social networking system may disable the image feature in response to the determination that the data usage by the user during the period of time satisfies the data-usage threshold.

In another example, the one or more features may include a video feature and the social networking system may reduce (522) a resolution of a video in the video feature. For example, the social networking system may, at the initial quality of service, provide the video to the user at a first resolution (e.g., 1080 p). However, the social networking system may, at the reduced quality of service, provide the video to the user at a second, lower resolution (e.g., 720 p or lower). In some embodiments, the social networking system may display the video with a reduced frame rate. In some embodiments, the social networking system may restrict volume of a video in the video feature. In another example, the social networking system may restrict interactions with the video (e.g., the user may not be able to like, comment, and/or share the restricted video). In some embodiments, the social networking system may disable the video feature in response to the determination that the data usage by the user during the period of time satisfies the data-usage threshold.

In another example, the one or more features may include an audio feature and the social networking system may reduce (524) an acoustic quality (e.g., reduce a degree of fidelity) of an audio file in the audio feature. In another example, the social networking system may limit a volume output in the audio feature. In some embodiments, the social networking system may disable the audio feature in response to the determination that the data usage by the user during the period of time satisfies the data-usage threshold.

In another example, the one or more features may include a notification feature and the social networking system may disable (526) the notification feature. Alternatively, in some embodiments, the social networking system may reduce a number of notifications receivable by the user for a time window of the period of time. For example, the social networking system may limit notifications receivable by the user during a specified time period (e.g., in a day).

In another example, the one or more features may include a messaging feature and the social networking system may disable the messaging feature. Alternatively, in some embodiments, the social networking system may reduce a number of messages receivable by the user for a time window of the period of time. For example, the social networking system may limit messages receivable by the user during a specified time period (e.g., in a day). In some embodiments, the social networking system may limit a number of characters that may be included in a message.

One skilled in the art will appreciate that the examples above are non-limiting, and the social networking system may reduce the quality of service for any of the features provided by the social networking service.

The social networking system may provide (528) the one or more features of the first plurality of features to the user at the reduced quality of service for the one or more features of the first plurality of features. For example, the social networking system may provide (530) the image to the user at the reduced resolution. In another example, the social networking system may provide (532) the video to the user at the reduced resolution. In another example, the social networking system may provide (534) the audio file to the user at the reduced acoustic quality. In another example, the social networking system may cease (536) notification to the user, in accordance with disabling the notification feature. In addition, the social networking system may provide (550, FIG. 5C) the one or more features of the second plurality of features to the user at the reduced quality of service for the one or more features of the second plurality of features.

In some embodiments, the reduced quality of service for the one or more features of the first plurality of features may differ from the reduced quality of service for the one or more features of the second plurality of features. In some embodiments, the two reduced qualities of service may be the same.

In some embodiments, after reducing the quality of service for the user for the one or more features of the plurality of features, the social networking system may continue to monitor data usage by the user during the period of time. For example, referring to FIG. 3A, the social networking system continues to monitor data usage during the month of February, 2016 after the point in time A.

In some embodiments, in response to a determination that the data usage by the user during the period of time does not satisfy the second data-usage threshold that is greater than the first data-usage threshold (538—No), the social networking system may continue (540) providing the plurality of features at the reduced quality of service. For example, referring to FIG. 3A, between point in time A and point in time B, data usage 302 by the user does not meet and/or exceed the second data-usage threshold 306. As such, the social networking system may continue providing the plurality of features at the reduced quality of service between the point in time A and the point in time B.

Referring to FIG. 3B, the social networking system may set another data-usage threshold 319 for the first plurality of features which is similar in effect to the second data-usage threshold 306 in FIG. 3A. Accordingly, in response to a determination that the data usage (e.g., data usage for the first plurality of features 312 or the data usage for the second plurality of features 318, FIG. 3B) by the user during the period of time does not satisfy the other data-usage threshold 319 that is greater than the first data-usage threshold 314 (or the second data-usage threshold 316), the social networking system may continue providing the first plurality of features at the reduced quality of service and may continue (542) providing the second plurality of features at the initial quality of service (or vice versa when the second plurality of features is being provided at the reduced quality of service and the first plurality of features is being provided at the initial quality of service).

In some embodiments, in response to a determination that the data usage by the user during the period of time satisfies the second data-usage threshold that is greater than the first data-usage threshold (538—Yes), the social networking system may cease (544) providing the plurality of features to the user. For example, referring to FIG. 3A, at point in time B, data usage 302 by the user satisfies the second data-usage threshold 306. As such, after the point in time B, the social networking system may cease providing the plurality of features to the user. In some embodiments, instead of ceasing to provide the plurality of features, the social networking system may further reduce the quality of service for the plurality of features. For example, the social networking system may provide, for display by the client device 104, an image in the image feature at a further reduced resolution.

In some embodiments involving first and second pluralities of features, in response to a determination that the data usage (e.g., data usage for the first plurality of features 312, FIG. 3B) by the user during the period of time satisfies the other data-usage threshold (e.g., the other data-usage threshold 319, FIG. 3B) that is greater than the first data-usage threshold (or the second data-usage threshold), the social networking system may cease providing the first plurality of features at the reduced quality of service and may continue (546) providing the second plurality of features to the user (e.g., at the reduced quality of service for the second plurality of features or at the initial quality of service). In some embodiments, instead of ceasing to provide the first plurality of features, the social networking system may further reduce the quality of service for one or more features of the first plurality of features.

Alternatively or in addition, in some embodiments involving first and second pluralities of features, after reducing the quality of service for the user for the one or more features of the first plurality of features and in response to a determination that the data usage by the user during the period of time satisfies the second data-usage threshold (e.g., second data-usage threshold 316, FIG. 3B), the social networking system may reduce the quality of service for the user for one or more features of the second plurality of features and may provide the one or more features of the second plurality of features to the user at the reduced quality of service for the one or more features of the second plurality of features. Alternatively, in some embodiments, the social networking system may cease providing the second plurality of features to the user. FIG. 3B shows an example of the second data-usage threshold being satisfied; at the point in time C, both the data usage for the first plurality of features 312 and the data usage for the second plurality of features 318 satisfy their respective thresholds.

In some embodiments, the social networking system may use information based, at least in part, on one or more user selections to set the first data-usage threshold and/or the second data-usage threshold. For example, before setting the first data-usage threshold (502), the social networking system may receive (556, FIG. 5D) user selection of the first plurality of features in the social networking service. In some embodiments, the social networking system may receive (558) user selection of the second plurality of features in the social networking service. For example, the user may choose the video feature and the image feature to be part of the first plurality of features and may choose the notification feature and the audio feature to be part of the second plurality of features.

In some embodiments, when setting the first data-usage threshold (502), the social networking system may set the first data-usage threshold in response to receiving the user selection of the first plurality of features (e.g., the first data-usage threshold may be set in accordance with the user selection of the first plurality of features). For example, the user selection may indicate that the user plans to use some features more frequently than some other features during the period of time. Accordingly, the social networking system may increase the first data-usage threshold (e.g., the social networking system may increase the data quota specifically for the first plurality of features) so that the user may use consume more data using the first plurality of features.

In some embodiments, the social networking system may set (560) a second data-usage threshold (e.g., second data-usage threshold 316, FIG. 3B) in response to receiving the user selection of the second plurality of features (e.g., the second data-usage threshold may be set in accordance with the user selection of the second plurality of features). For example, the user selection may indicate that the user plans to limit usage of some features during the period of time. Accordingly, the social networking system may decrease the second data-usage threshold (e.g., the data quota specifically for the second plurality of features) so that the user may use consume more data using the first plurality of features. The user may allocate a greater percentage of an amount of allotted data to the first plurality of features so that the user may consume more data while using the first plurality of features at the initial quality of service. In some embodiments, the first data-usage threshold may differ from the second data-usage threshold. Alternatively, in some embodiments, the first and second data-usage thresholds may be the same.

In some embodiments, in addition to providing the first plurality of features to the user at the initial quality of service (510), the social networking system may provide (562) the second plurality of features to the user at the initial quality of service until the data usage (e.g., data usage for the second plurality of features) by the user during the period of time satisfies the second data-usage threshold (e.g., at point in time C, when data usage for the second plurality of features 318 meets and/or exceeds the second data-usage threshold 316, FIG. 3B). In some embodiments, in response to a determination that data usage for the second plurality of features by the user during the period of time satisfies the second data-usage threshold, the social networking system may provide the one or more features of the second plurality of features at a reduced quality of service. Alternatively, in some embodiments, the social networking system may cease providing the second plurality of features in response to the determination that data usage for the second plurality of features by the user during the period of time satisfies the second data-usage threshold. Providing the second plurality of features is discussed in further detail above with reference to FIG. 5A and FIG. 5C.

In other embodiments, in addition to providing the first plurality of features to the user at the first quality of service (510), the social networking system may provide (564) the second plurality of features at a second quality of service until the data usage (e.g., data usage for the second plurality of features 318, FIG. 3B) by the user during the period of time satisfies the second data-usage threshold. For example, user selection may signal the social networking system to provide the second plurality of features at the second quality of service. In some embodiments, the social networking system may provide the second plurality of features at the second quality of service in response to receiving the user selection (e.g., dynamically adjusts the quality of service). The second quality of service is different from the first quality of service (the initial quality of service may be the first quality of service). In some embodiments, providing features at the second quality of service consumes less data relative to data consumption resulting from providing features at the first quality of service.

In some embodiments, the social networking system may use information based, at least in part, on one or more data-usage patterns to set the first data-usage threshold and/or the second data-usage threshold. For example, before setting the first data-usage threshold (502), the social networking system may determine (566, FIG. 5E) one or more data-usage patterns for the user (e.g., over a statistically significant period of time). In some embodiments, the one or more data-usage patterns may indicate a greater usage by the user of the first plurality of features than the second plurality of features, or vice versa. For example, referring to FIG. 3C, the diagram 320 shows a first data-usage pattern 322 for a first plurality of features by the user during the statistically significant period of time. In addition, the diagram 320 shows a second data-usage pattern 324 for a second plurality of features by the user during the statistically significant period of time. As shown, the user consumed more data using the first plurality of features relative to the second plurality of features.

In some embodiments, when setting the first data-usage threshold (502, FIG. 5A), the social networking system may set the first data-usage threshold in accordance with one of the one or more data-usage patterns. For example, the social networking system may set the first data-usage threshold (e.g., first data-usage threshold 314, FIG. 3B) in accordance with the first data-usage pattern 322 (FIG. 3C) for the first plurality of features by the user.

In addition, in some embodiments, the social networking system may set (568, FIG. 5E) a second data-usage threshold in accordance with one of the one or more data-usage patterns. For example, the social networking system may set the second data-usage threshold (e.g., second data-usage threshold 316, FIG. 3B) in accordance with the second data-usage pattern 324 (FIG. 3C) for the second plurality of features by the user. In some embodiments, the first and second data-usage threshold may differ. Alternatively, in some embodiments, the first and second data-usage threshold may be the same.

In some embodiments, prior to setting the first and second data-usage thresholds in accordance with the one or more data-usage patterns, the social networking system may ask the user to opt-in to (or opt-out of) dynamic threshold setting processes (e.g., setting thresholds in accordance with data-usage patterns may be a dynamic threshold setting process).

In some embodiments, in addition to providing the first plurality of features to the user at the initial quality of service (510), the social networking system may provide (570) the second plurality of features to the user at the initial quality of service until the data usage (e.g., data usage for the second plurality of features) by the user during the period of time satisfies the second data-usage threshold. In some embodiments, the social networking system may provide the first plurality of features at the first quality of service and may provide the second plurality of features at the second quality of service as discussed above at step 564 (or vice versa). Providing the second plurality of features is discussed in further detail above with reference to FIG. 5A and FIG. 5C.

In some embodiments, the social networking system may analyze the data-usage patterns (e.g., data-usage pattern 322 and data-usage pattern 324, FIG. 3C) and may determine that the user uses certain features infrequently (or may determine that the user uses certain features frequently). As such, the social networking system may present planning options to the user (e.g., via the client device 104-1). For example, the planning options may indicate to the user that he or she infrequently uses a particular feature provided by the social networking service (e.g., the planning option may state "do you want to use less of the audio feature?"), such that a frequency of use of the particular feature does not satisfy a threshold. The user may select an option that allocates less data to the particular feature. In this way, the user may signal the social networking system to allocate additional data to other features that the user uses at a higher frequency. Consequently, the user-selection steps discussed above may be performed in combination with the data-usage pattern steps.

Figure 5A:
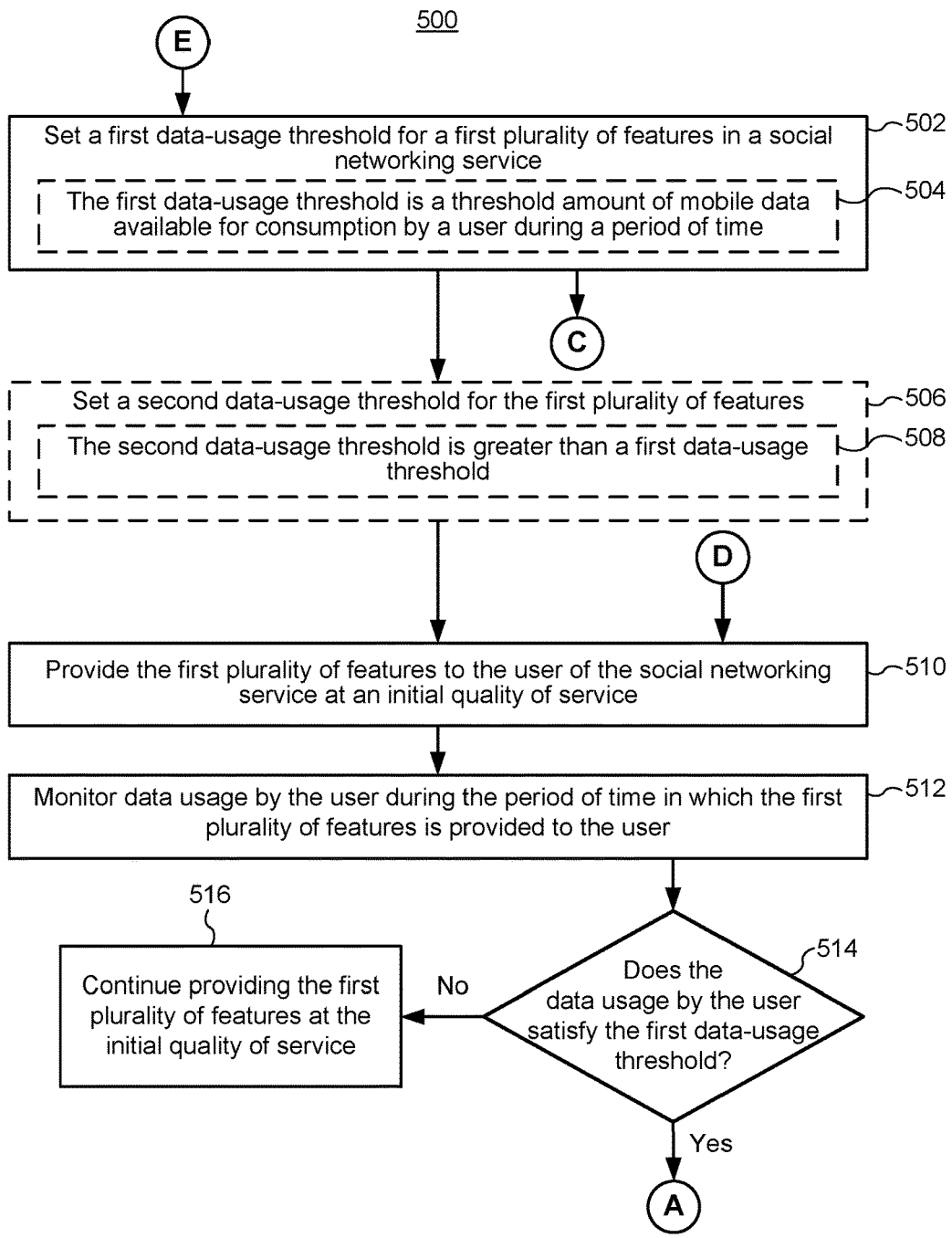
FIGS. 5A-5F are flow diagrams illustrating a method of adjusting a user experience on a social networking service, in accordance with some embodiments.
Figure 5B:
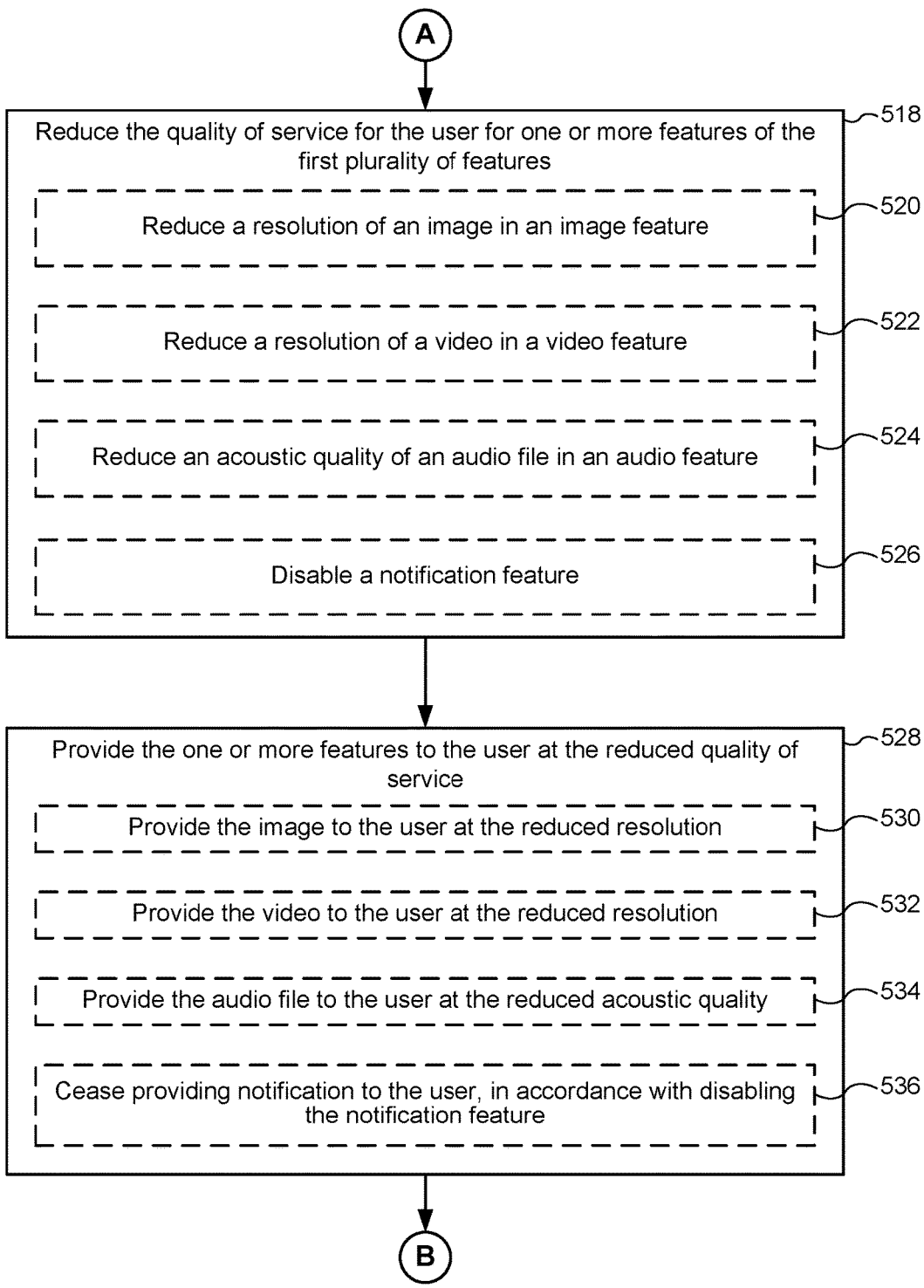
Figure 5C:
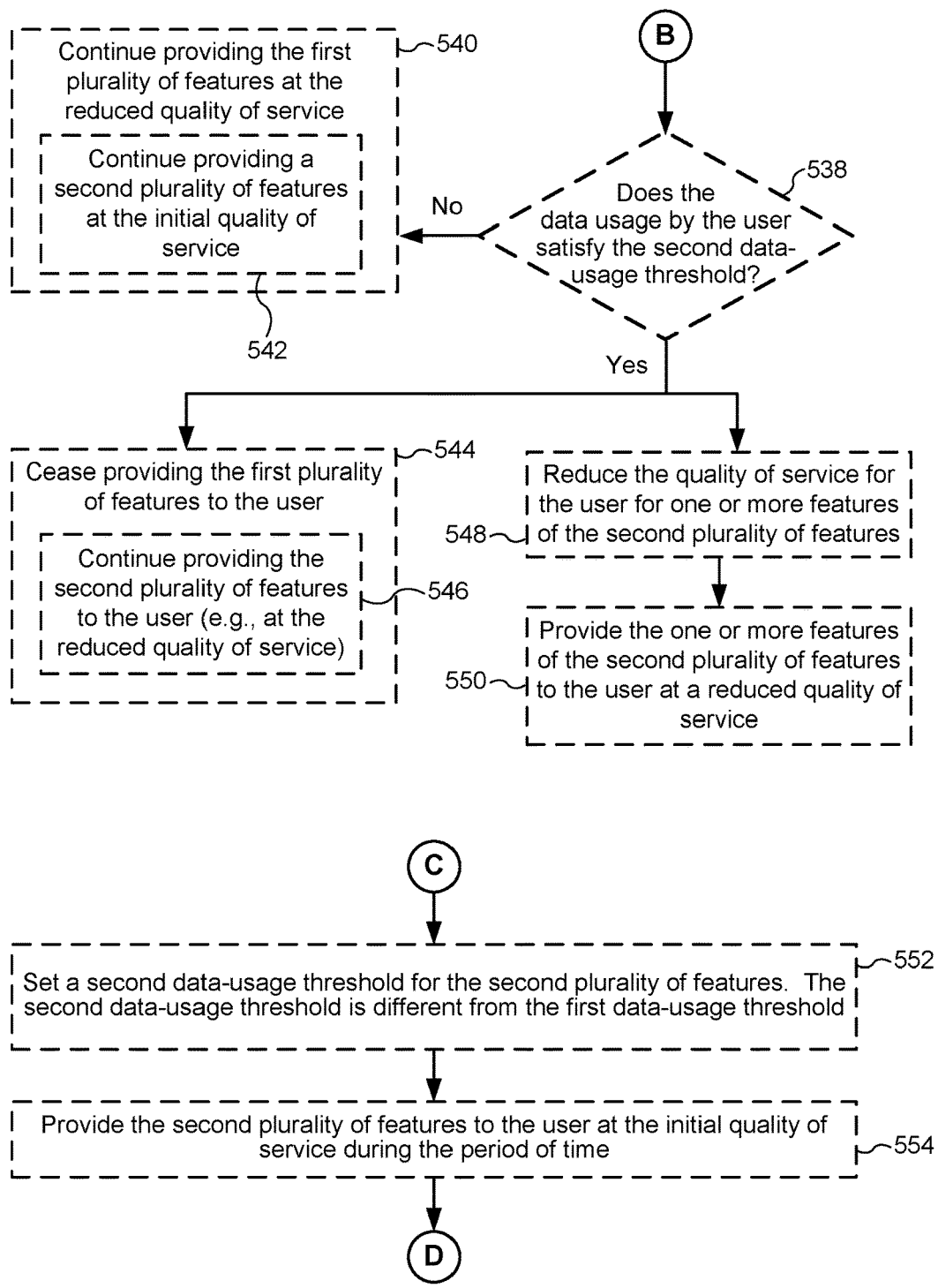
Figure 5D:
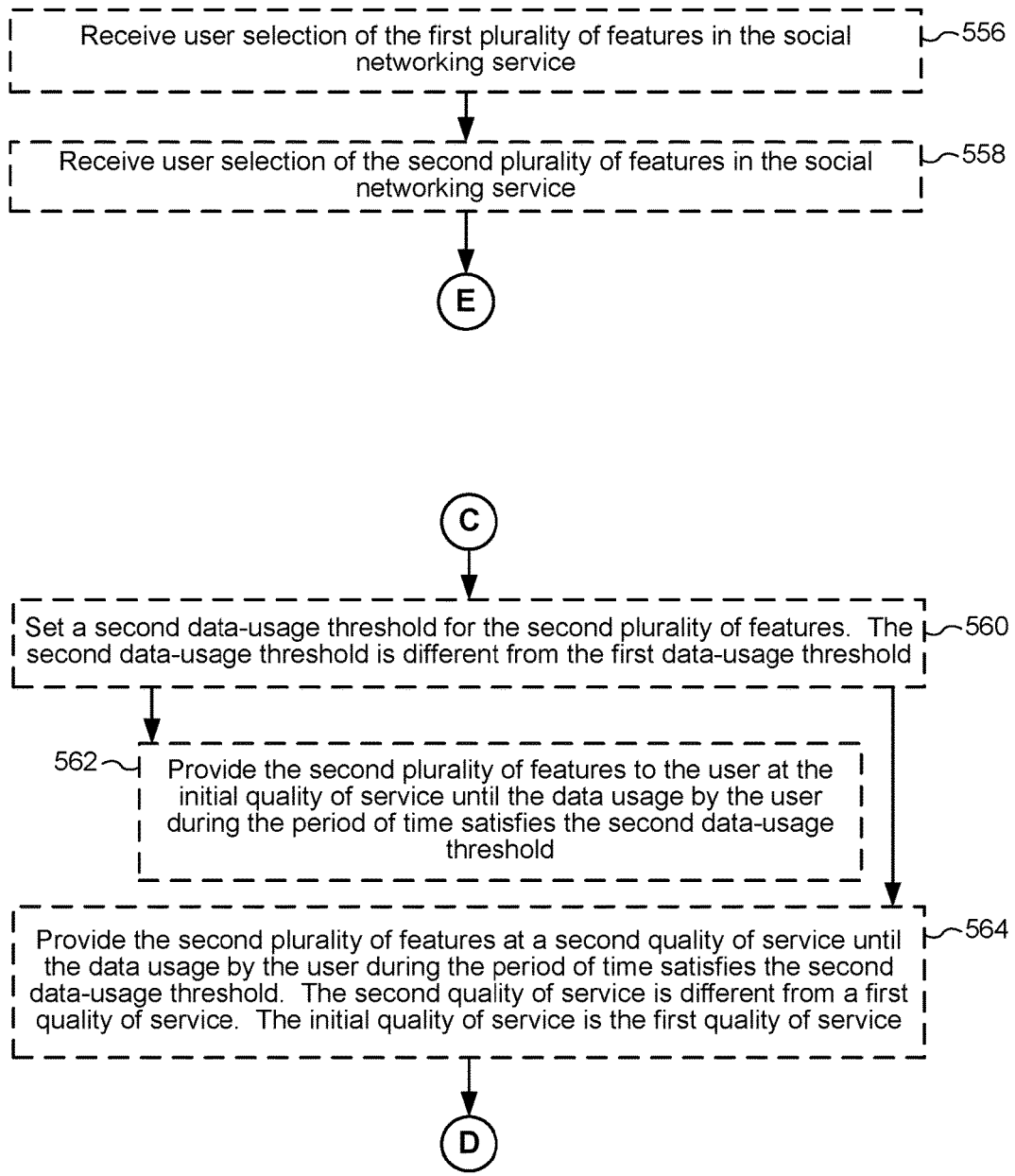
Figure 5E:
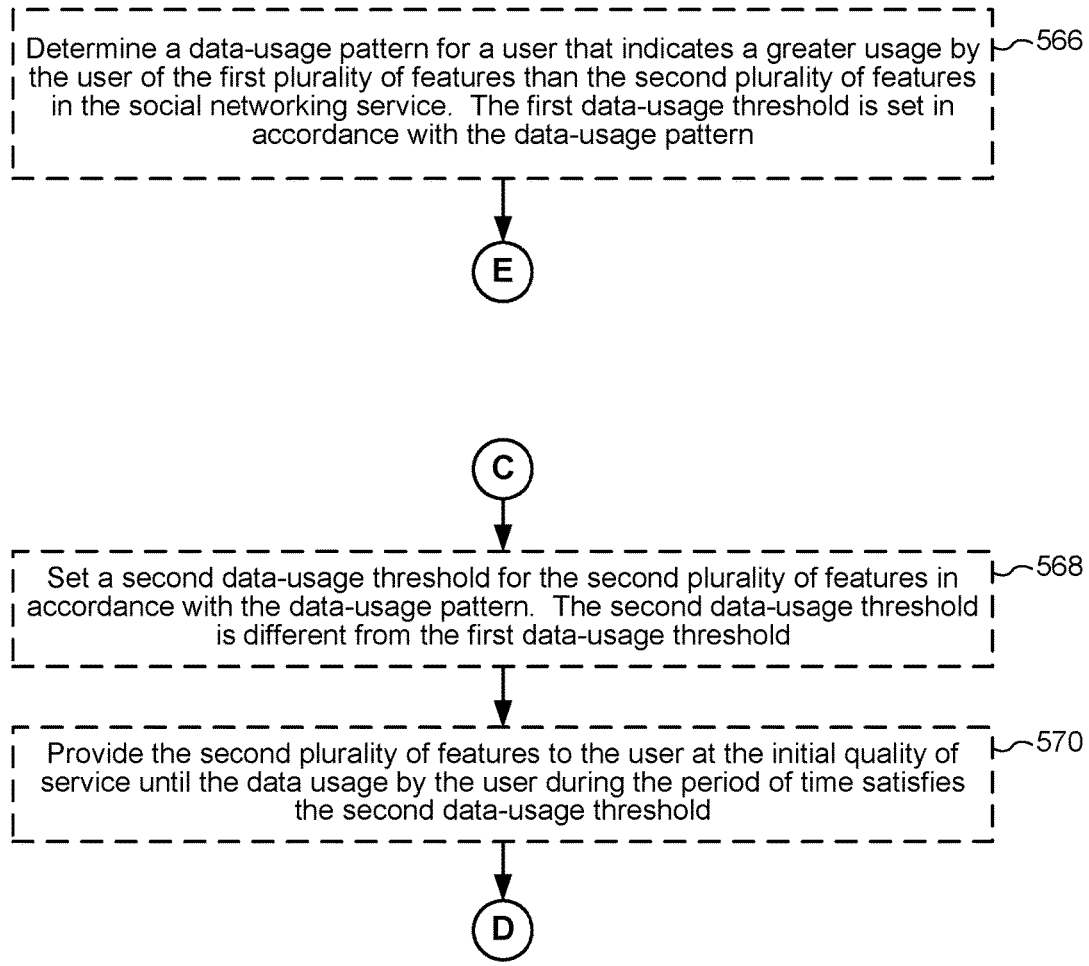
Figure 5F:
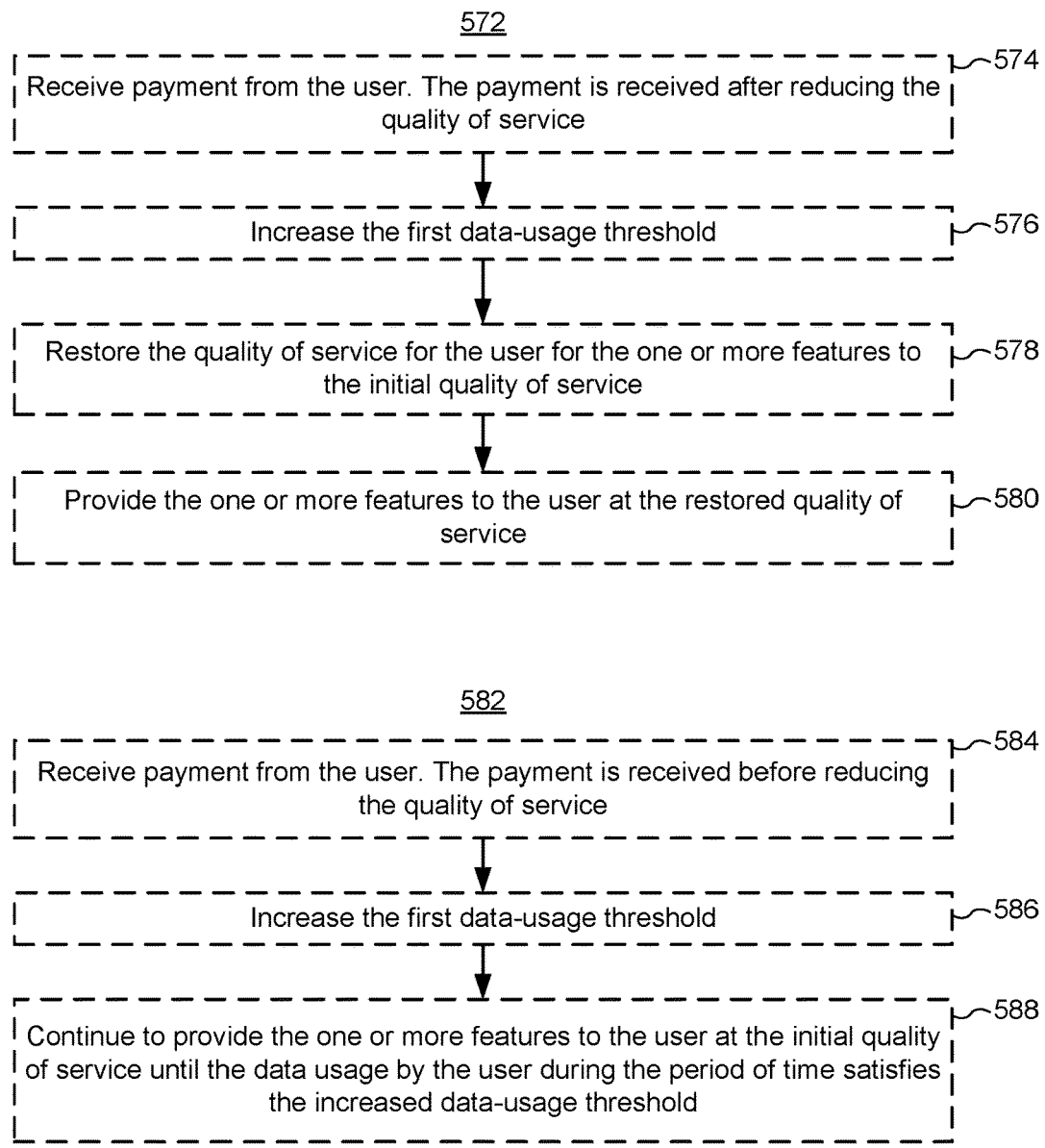

In some embodiments, the method 500 may include method 572 (FIG. 5F). The steps of the method 572 may be performed in conjunction with the steps of the method 500. For example, the steps of the method 572 may be performed after step 518 of the method 500.

In performing the method 572, the social networking system may receive (574) payment from the user after reducing the quality of service. As discussed above, in some embodiments, the social networking system may reduce (518, FIG. 5B) the quality of service in response to the determination that the data usage by the user during the period of time satisfies the data-usage threshold (514—Yes, FIG. 5A).

In some embodiments, in response to receiving the payment from the user, the social networking system may increase (576) the data-usage threshold. For example, referring to FIG. 3A, the social networking system may increase the first data-usage threshold 302 to the second data-usage threshold 306. In another example, the social networking system may increase the first data-usage threshold 302 to a third data-usage threshold 308. In some embodiments, the third data-usage threshold 308 is greater than the first 304 and second 306 data-usage thresholds. Alternatively, in some embodiments, the third data-usage threshold 308 may be greater than the first data-usage threshold 304 but may be less than the second data-usage threshold 306. In some embodiments, a degree of increase of the data-usage threshold depends on the payment received. For example, a first payment may be a first amount of money and therefore the social networking system may increase, referring to FIG. 3A, the first data-usage threshold 302 to the second data-usage threshold 306. In another example, a second payment may be a second amount of money and therefore the social networking system may increase, referring to FIG. 3A, the first data-usage threshold 302 to the third data-usage threshold 308. In some embodiments, the second amount of money is greater than the first amount of money.

In some embodiments, the social networking system may restore (578) the quality of service for the user for the one or more features to the initial quality of service in response to the payment and may provide (580) the one or more features to the user at the restored quality of service. The social networking system may continue to provide the one or more features to the user at the restored quality of service until the data usage by the user during the period of time satisfies the increased data-usage threshold (e.g., the third data-usage threshold 308, FIG. 3A).

In some embodiments, as an alternative or in addition to receiving payment from the user, the social networking system may receive a gift of data from another user, provide the gift of data to the user (e.g., quota sharing or quota donating), and increase the data-usage threshold in accordance with the gift. For example, the other user may gift some or all of his or her data quota for the period of time to the user. In some embodiments, the social networking system may limit gifting between contacts. For example, the social networking system may determine a connection (e.g., an edge) between a first user (e.g., a first node) and a second user (e.g., a second node) of the social networking service using connection information (e.g., connection information 220, FIG. 2A). In response to determining that a connection exists, the social networking system may provide the gift of data from the second user to the first user (or vice versa).

In some embodiments, the method 500 may include method 582 (FIG. 5F). The steps of the method 582 may be performed in conjunction with the steps of the method 500. For example, the steps of the method 582 may be performed before step 518 of the method 500.

In performing the method 582, the social networking system may receive (584) payment from the user before reducing the quality of service. For example, referring to FIG. 3A, the social networking system may receive the payment from the user prior to the point in time A.

In some embodiments, in response to receiving the payment from the user, the social networking system may increase (586) the data-usage threshold. For example, referring to FIG. 3A, the social networking system may increase the first data-usage threshold 302 to the second data-usage threshold 306. In another example, the social networking system may increase the first data-usage threshold 302 to the third data-usage threshold 308. Increasing the data-usage threshold is discussed in further detail above with reference to step 576.

In some embodiments, the social networking system may continue (588) to provide the one or more features to the user at the initial quality of service until the data usage by the user during the period of time satisfies the increased data-usage threshold. For example, in embodiments where the first data-usage threshold 304 is increased to the second data-usage threshold 306, the social networking system may provide the one or more features at the initial quality of service, after the point in time A but before the point in time B (FIG. 3A). Furthermore, in response to a determination that the data usage by the user during the period of time satisfies the increased data-usage threshold (e.g., the second data-usage threshold 306), the social networking system may reduce the quality of service for the user for one or more features of the plurality of features (e.g., proceed to step 518, FIG. 5B).

In another example, in embodiments where the first data-usage threshold 304 is increased to the third data-usage threshold 308, the social networking system may provide the one or more feature at the initial quality of service, after the point in time A (FIG. 3A). Furthermore, in response to a determination that the data usage by the user during the period of time satisfies the increased data-usage threshold (e.g., the third data-usage threshold 308), the social networking system may reduce the quality of service for the user for one or more features of the plurality of features (e.g., proceed to step 518, FIG. 5B).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a server system having one or more processors and memory storing instructions for execution by the one or more processors:
   setting a first data-usage threshold for a first plurality of features in a social networking service;
   setting a second data-usage threshold for a second plurality of features in the social networking service, wherein the second data-usage threshold is greater than the first data-usage threshold;
   providing the first plurality of features and the second plurality of features to a user of the social networking service at an initial quality of service;
   monitoring data usage by the user during a period of time in which the first plurality of features and the second plurality of features are provided to the user;
   in response to a determination that the data usage by the user during the period of time satisfies the first data-usage threshold:
     reducing the quality of service for the user for one or more features of the first plurality of features; and
     providing the one or more features of the first plurality of features to the user at the reduced quality of service; and
   after reducing the quality of service for the user for the one or more features of the first plurality of features and in response to a determination that the data usage by the user during the period of time satisfies the second data-usage threshold:
     reducing the quality of service for the user for one or more features of the second plurality of features; and
     providing the one or more features of the second plurality of features to the user at the reduced quality of service.

2. The method of claim 1, wherein the first data-usage threshold is a threshold amount of mobile data available for consumption by the user during the period of time.

3. The method of claim 1, wherein:
   the one or more features of the first plurality of features include an image feature;
   reducing the quality of service for the user to the one or more features of the first plurality of features comprises reducing a resolution of an image in the image feature; and
   providing the one or more features of the first plurality of features to the user at the reduced quality of service comprises providing the image to the user at the reduced resolution.

4. The method of claim 1, wherein:
   the one or more features of the first plurality of features include a video feature;
   reducing the quality of service for the user to the one or more features of the first plurality of features comprises reducing a resolution of a video in the video feature; and
   providing the one or more features of the first plurality of features to the user at the reduced quality of service comprises providing the video to the user at the reduced resolution.

5. The method of claim 1, wherein:
   the one or more features of the first plurality of features include an audio feature;
   reducing the quality of service for the user to the one or more features of the first plurality of features comprises reducing an acoustic quality of an audio file in the audio feature; and
   providing the one or more features of the first plurality of features to the user at the reduced quality of service comprises providing the audio file to the user at the reduced acoustic quality.

6. The method of claim 1, wherein:
   the one or more features of the first plurality of features include a notification feature;
   reducing the quality of service for the user to the one or more features of the first plurality of features comprises disabling the notification feature; and providing the one or more features of the first plurality of features to the user at the reduced quality of service comprises ceasing to provide notification to the user, in accordance with disabling the notification feature.

7. The method of claim 1, further comprising, at the server system, after reducing the quality of service for the user for the one or more features of the first plurality of features and in response to a determination that the data usage by the user during the period of time satisfies the second data-usage threshold, ceasing to provide the first plurality of features to the user.

8. The method of claim 7, further comprising, at the server system, after ceasing to provide the first plurality of features to the user, continuing to provide the second plurality of features to the user.

9. The method of claim 1, further comprising, at the server system:
receiving payment from the user; and
in response to receiving the payment, increasing the first data-usage threshold.

10. The method of claim 9, wherein:
the payment is received after reducing the quality of service for the one or more features of the first plurality of features; and
the method further comprises, at the server system, in response to receiving the payment:
restoring the quality of service for the user for the one or more features of the first plurality of features to the initial quality of service; and
providing the one or more features of the first plurality of features to the user at the restored quality of service.

11. The method of claim 9, wherein:
the payment is received before reducing the quality of service for the one or more features of the first plurality of features; and
the method further comprises, at the server system, continuing to provide the one or more features of the first plurality of features to the user at the initial quality of service until the data usage by the user during the period of time satisfies the increased data-usage threshold.

12. The method of claim 1, further comprising, at the server system:
receiving user selection of the first plurality of features, wherein the first data-usage threshold is set in response to receiving the user selection of the first plurality of features;
receiving user selection of the second plurality of features in the social networking service; and
setting the second data-usage threshold for the second plurality of features in response to receiving the user selection of the second plurality of features.

13. The method of claim 1, further comprising, at the server system:
determining a data-usage pattern for the user that indicates a greater usage by the user of the first plurality of features than the second plurality of features in the social networking service, wherein the first data-usage threshold is set in accordance with the data-usage pattern, and the second data-usage threshold for the second plurality of features is set in accordance with the data-usage pattern.

14. A server system, comprising:
one or more processors; and
memory storing one or more programs for execution by the one or more processors, the one or more programs including instructions for:
setting a first data-usage threshold for a first plurality of features in a social networking service;
setting a second data-usage threshold for a second plurality of features in the social networking service, wherein the second data-usage threshold is greater than the first data-usage threshold;
providing the first plurality of features and the second plurality of features to a user of the social networking service at an initial quality of service;
monitoring data usage by the user during a period of time in which the first plurality of features and the second plurality of features are provided to the user;
in response to a determination that the data usage by the user during the period of time satisfies the first data-usage threshold:
reducing the quality of service for the user for one or more features of the first plurality of features; and
providing the one or more features of the first plurality of features to the user at the reduced quality of service; and
after reducing the quality of service for the user for the one or more features of the first plurality of features and in response to a determination that the data usage by the user during the period of time satisfies the second data-usage threshold:
reducing the quality of service for the user for one or more features of the second plurality of features; and
providing the one or more features of the second plurality of features to the user at the reduced quality of service.

15. A non-transitory computer-readable storage medium, storing one or more programs configured for execution by one or more processors of a server system, the one or more programs including instructions for:
setting a first data-usage threshold for a first plurality of features in a social networking service;
setting a second data-usage threshold for a second plurality of features in the social networking service, wherein the second data-usage threshold is greater than the first data-usage threshold;
providing the first plurality of features and the second plurality of features to a user of the social networking service at an initial quality of service;
monitoring data usage by the user during a period of time in which the first plurality of features and the second plurality of features are provided to the user;
in response to a determination that the data usage by the user during the period of time satisfies the first data-usage threshold:
reducing the quality of service for the user for one or more features of the first plurality of features; and
providing the one or more features of the first plurality of features to the user at the reduced quality of service; and
after reducing the quality of service for the user for the one or more features of the first plurality of features and in response to a determination that the data usage by the user during the period of time satisfies the second data-usage threshold:
reducing the quality of service for the user for one or more features of the second plurality of features; and providing the one or more features of the second plurality of features to the user at the reduced quality of service.

\* \* \* \* \*